(No Model.)
J. S. TRIMBLE & W. M. KIRKPATRICK.
NUT LOCK.
No. 428,183.  Patented May 20, 1890.
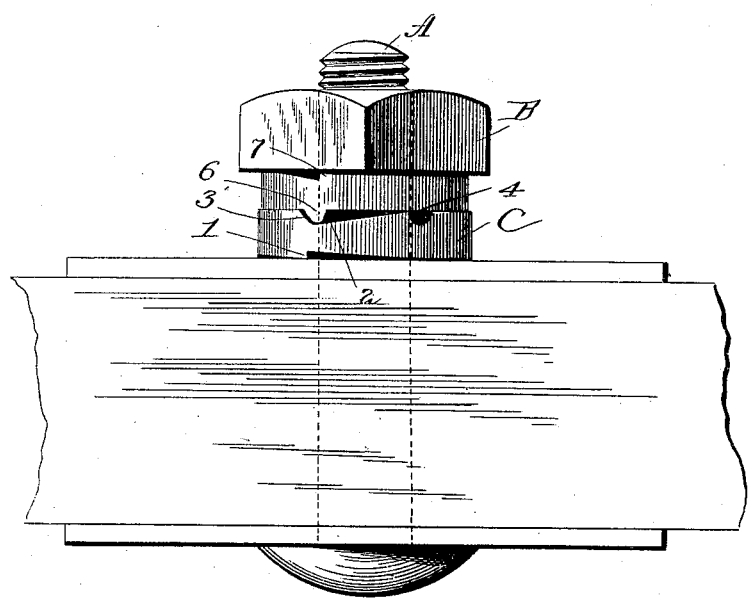
Inventors
John S. Trimble
W. M. Kirkpatrick United States Patent Office.

JOHN S. TRIMBLE AND WILLIAM M. KIRKPATRICK, OF SHELBY, OHIO; SAID KIRKPATRICK ASSIGNOR TO SAID TRIMBLE.

NUT-LOCK.

SPECIFICATION forming part of Letters Patent No. 428,183, dated May 20, 1890.

Application filed May 25, 1889. Serial No. 312,172. (No model.)

*To all whom it may concern:*

Be it known that we, JOHN S. TRIMBLE and WILLIAM M. KIRKPATRICK, of Shelby, in the county of Richland and State of Ohio, have invented a new and useful Improvement in Nut-Locks; and we do hereby declare that the following is a full, clear, and exact description of the same.

Our object is to provide a nut-lock which will not necessitate any special construction of the bolt or nut, and one which shall be automatic in its action—that is, when the nut is run upon the thread to proper position a resistance to backward movement is automatically applied, and the nut is held firmly against jar or jolting action, and can be removed only by a strong continuous pressure being exerted thereon.

The drawing represents the parts in place with the nut locked.

In the drawing, A is the threaded bolt, and B the nut, both of ordinary construction.

C is a collar, adapted to be placed over the bolt and against the surface of the article or part to be bolted. This we designate the "gripping" washer or collar, as it is through this primarily that the gripping or locking effect is automatically secured. It is formed with a spur 1 on its inner face, adapted to engage the article and to embed itself therein slightly when pressure is exerted. On its outer face it has an incline 2, ending in a shoulder 3, and a notch 4. Next outside this washer is a second interposed collar or washer, and this is formed with a projection 6 on its inner face and a gripping-spur 7 on its outer side. The projection 6 and spur 7 are intended to engage the incline of the gripping-collar and the nut, respectively.

When the parts are in position, the turning of the nut forward will cause them to assume the positions shown in relation to each other—that is, if they are not already in this position when the operation begins—that is to say, the projection on the second collar will be at the bottom of the incline on the gripping-washer, and the spurs 1 and 7 will be in engagement with the article and the nut, respectively. Continued movement of the nut will jam the parts together, and the spurs will embed themselves slightly, or at least grip firmly the adjacent parts, rendering the gripping-collar practically a part of the article, (as far as backward movement is concerned,) and the second collar likewise practically a part of the nut, and movable only therewith. The inclination of the surface 2 is greater than the pitch of the threads of the bolt, and it will be seen from this that as the nut and second washer are gripped together jarring or jolting action will have no loosening effect, as the slightest movement of the projection of the second collar up the incline will force and jam the nut against the threads of the bolt and more securely lock the parts.

In order to remove the nut, continuous pressure must be exerted thereon until the projection reaches the notch 4, when the grip or locking effect will be broken and the parts sufficiently loosened for the easy removal of the nut, which, with all the other parts, may be used again and again.

What we claim is—

In combination, the bolt and the nut, the gripping-collar having the incline and notch on its outer face and the spur on its inner face to hold it against backward movement, and the second interposed collar having the projection on its inner face adapted to said incline and notch, and having also a spur on its outer face bearing against the inner face of the nut, substantially as described.

In testimony whereof we have signed our names to this specification in the presence of two subscribing witnesses.

JOHN S. TRIMBLE.
W. M. KIRKPATRICK.

Witnesses:
H. J. BYRER,
WILLIAM OWINGS.